(12) United States Patent
Garg et al.

(10) Patent No.: US 7,546,633 B2
(45) Date of Patent: Jun. 9, 2009

(54) ROLE-BASED AUTHORIZATION MANAGEMENT FRAMEWORK

(75) Inventors: Praerit Garg, Kirkland, WA (US); Cliff Van Dyke, Bellevue, WA (US); Dave McPherson, Bothell, WA (US); Everett McKay, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 10/281,083

(22) Filed: Oct. 25, 2002

(65) Prior Publication Data

US 2004/0083367 A1  Apr. 29, 2004

(51) Int. Cl.
G06F 17/30 (2006.01)
H04L 9/32 (2006.01)

(52) U.S. Cl. ............... 726/4; 726/1; 713/170
(58) Field of Classification Search ............ 726/4, 726/1; 713/170
See application file for complete search history.

(56) References Cited

U.S. PATENT DOCUMENTS

| | | | |
|---|---|---|---|
| 5,748,890 A * | 5/1998 | Goldberg et al. | 726/2 |
| 5,911,143 A * | 6/1999 | Deinhart et al. | 707/103 R |
| 6,014,666 A * | 1/2000 | Helland et al. | 707/9 |
| 6,055,637 A * | 4/2000 | Hudson et al. | 726/20 |
| 6,189,103 B1 | 2/2001 | Nevarez et al. | |
| 6,222,856 B1 | 4/2001 | Krishnan et al. | |
| 6,519,647 B1 | 2/2003 | Howard et al. | |
| 7,107,610 B2 | 9/2006 | Lortz | |
| 7,131,000 B2 * | 10/2006 | Bradee | 713/164 |
| 2002/0095414 A1 | 7/2002 | Barnett et al. | |
| 2002/0133579 A1 | 9/2002 | Bernhardt et al. | |
| 2003/0041076 A1 * | 2/2003 | Lucovsky et al. | 707/500 |
| 2005/0171958 A9 * | 8/2005 | Cheng et al. | 707/100 |

OTHER PUBLICATIONS

ClickMail Central Directory. "What is LDAP?". pp. 1-2. May 11, 2000. Retrieved from the Internet.*
Probst, Stefan et al. "Reusable Components for Developing Security-Aware Applications," Proceedings of the 18th Annual Computer Security Applications Conference (ACSAC'02), 2002, pp. 1-10.*
"Delegation of Control Wizard", Sep. 5, 2002, available at <<http://www.serverwatch.com/tutorials/article.php/10825_1472441_2>>, accessed on Nov. 17, 2004, 4 pages.
"Netegrity SiteMinder5.5", Netegrity, Inc., 1999-2001, available at <<http://www.netegrity.com/products/index.cfm?leveltwo=SiteMinder>>, accessed on Oct. 9, 2002, 24 pages.
"Oblix Netpoint Product Description", Oblix, Inc, 2002, available at <<http://www.oblix.com/products/netpoint/net_description.html>>, printed on Oct. 9, 2002, 5 pages.

(Continued)

Primary Examiner—Emmanuel L Moise
Assistant Examiner—Michael Pyzocha
(74) Attorney, Agent, or Firm—Lee & Hayes, PLLC

(57) ABSTRACT

A role-based authorization management system maintains an authorization policy store that represents user authorizations to perform operations associated with an application. When a user attempts to perform a function associated with an application, the authorization management system verifies that the user is authorized to perform the requested function. The authorization management system also provides an interface for an application administrator to update role-based user authorization policies associated with one or more applications.

18 Claims, 11 Drawing Sheets

OTHER PUBLICATIONS

Schmidt, "Sec300 Application Security Model in Windows.net", Apr. 2002, available at <<http://web.mit.edu/pismere/presentations/teched2002/new-ms-kerberos-extensions.ptp>>, accessed on Nov. 17, 2004, 38 pages.

"Secure Web Portal", Baltimore Technologies plc., 2002, available at <<http://baltimore.com/securewebaccess/index.asp>>, accessed on Oct. 9, 2002, 2 pages.

"Solutions—What is enRole?", Access360, 1999-2002, available at <<http://www.access360.com/solutions.asp?section=solutions&subsection=whatisenrole&id=...>>, accessed on Oct. 9, 2002, 8 pages.

"What is LDAP?", ClickMail Central Directory, May 11, 2000, available at <<http://www.gracion.com/server/whatldap.html>>, Jul. 19, 2006, pp. 1-2.

"Windows Server Authorization Manager", Oct. 26, 2001, available at <<http://www.dotnetmaailma.com/video/201002003/4/Authorization_Manager.ppt>>, retrieved on Nov. 17, 2004, 36 pages.

\* cited by examiner

ROLE-BASED AUTHORIZATION MANAGEMENT FRAMEWORK

TECHNICAL FIELD

This invention relates to computer based application security and, in particular, to systems and methods for supporting role-based user authorization.

BACKGROUND

Many current computer systems manage user access to resources according to an object-centric paradigm. File system objects (e.g., files and directories) each have an associated access control list (ACL) that defines which users or groups of users are authorized to access the object in which ways. For example, one user (or group of users) may have read access to a particular file while another user (or group of users) may have read and write access to the file.

Using an ACL-based access control system works well for resource managers that have well defined persistent objects, such as the NT System Registry. An ACL can be attached to an object and access decisions can be made based on group membership in a user token and the contents of the ACL. In these types of applications there is little need for any business rule logic such as time of day or other runtime variables that may be relevant to the access decision.

Although the existing object-centric paradigm works well for many types of resource management, it can be unnatural and cumbersome for web-based and line of business applications which would be easier to manage using a resource management system that was organized in terms of the business organizational structure of a company. In these types of applications, authorization decisions are often not easily defined in terms of access to well-defined persistent objects, but rather, may require verifying a work flow or verifying access to multiple distinct application operations, such as querying a database or sending an email notification. Furthermore, access decisions may also be based on business logic such as an expense amount submitted in an expense application or verification of workflow completion. Because applications like these that don't have well defined persistent objects, there are not logical objects with which to associate an ACL. To use the ACL model in this type of an application, a security descriptor must be created at runtime, a token for the user retrieved, and a call made to a user verification function. This process is difficult to implement within a scripting environment. In addition to being an unnatural development model for web-based and line of business applications, the high degree of functionality of the ACL model is not needed in many applications. The functionality of the ACL model adds a degree of complexity to application administration that can be avoided if a more appropriate model can be used.

SUMMARY

A role-based access control framework is described. A role-based authorization management system includes an authorization policy store, an authorization interface, and an authorization manager. The authorization policy store provides a hierarchical representation of authorization objects and relationships between the authorization objects that define the role-based user authorization policies associated with one or more applications. The authorization interface provides a mechanism that allows an application to verify a user's authorization to perform operations associated with the application. The authorization manager provides a mechanism that allows an application administrator to update and maintain the role-based user authorization policies stored in the authorization policy store.

BRIEF DESCRIPTION OF THE DRAWINGS

The same numbers are used throughout the drawings to reference like features and components.

DETAILED DESCRIPTION

The following discussion is directed to a role-based access control framework that provides manageable administration and natural development of role-based user authorization policies. The role-based access control framework can be implemented as an authorization management system that provides a mechanism that allows an application administrator to define role-based user permissions associated with an application and a mechanism that allows the application to verify user authorization to perform operations associated with the application.

Role-based permissions may be associated with a user or with a computer system account. In the discussion that follows, the term "user" or "user account" is meant to indicate any user, user account, computer system account, or other entity that may be granted access permissions based on roles, as described herein.

Exemplary Role-Based Authorization Management System

Figure 1:
FIG. 1 illustrates components of an exemplary role-based authorization management system.
Figure 1:
Figure 1:

FIG. 1 illustrates an exemplary role-based authorization management system 102. The authorization management system 102 includes an authorization policy store 104, an authorization interface 106, and an authorization manager 108. Authorization policy store 104 stores a representation of role-based user permissions. Authorization interface 106 provides a mechanism for an application to query the authorization policy store 104 to determine a user's roles and provides a mechanism for the application to verify user authorization to perform an application function based on the role-based user permissions stored in authorization policy store 104. Authorization manager 108 provides a mechanism for an application administrator to define and manage the role-based user permissions that are stored in authorization policy store 104.

Exemplary Environment

Figure 2:
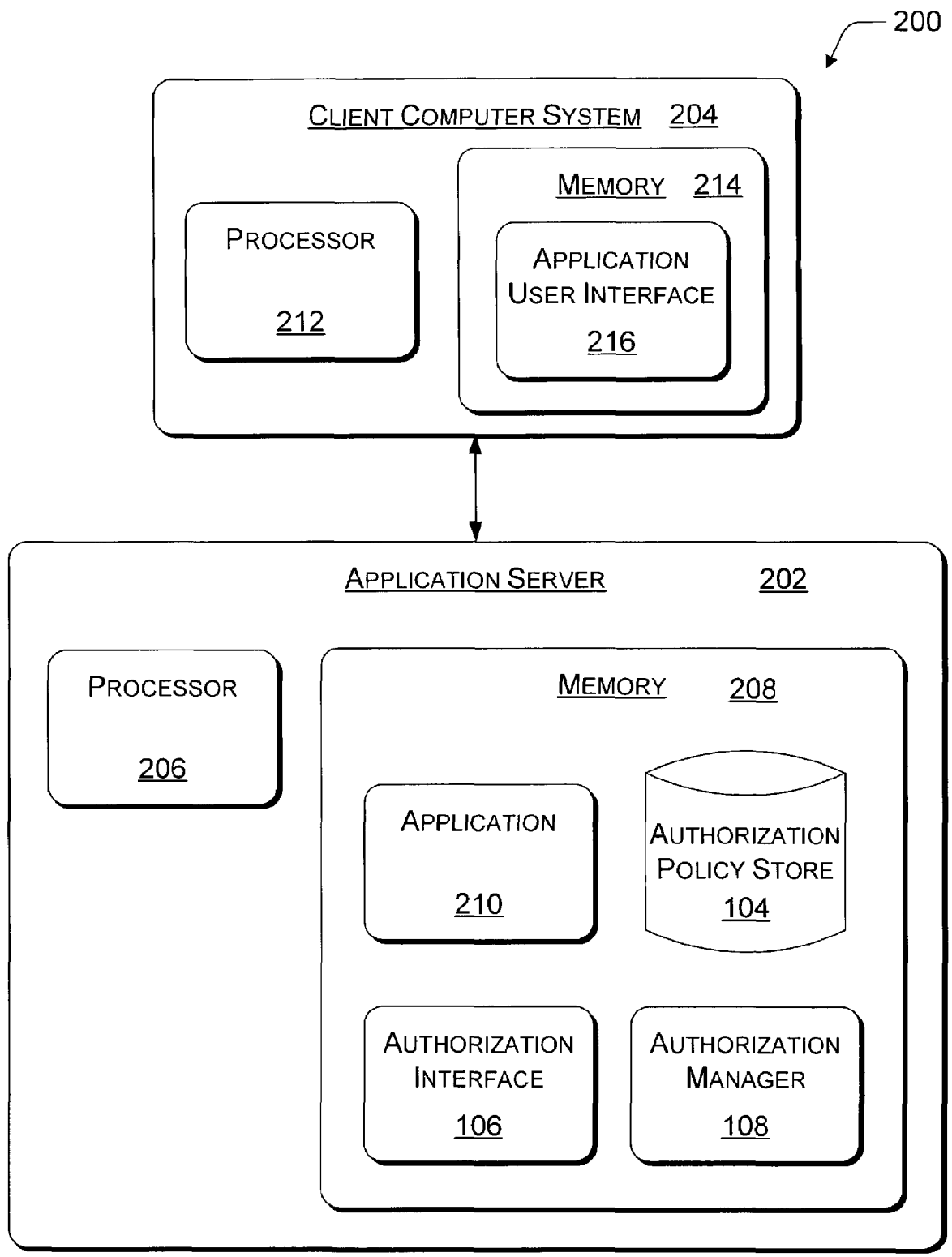
FIG. 2 illustrates an exemplary environment in which a role-based authorization management system may be implemented.

FIG. 2 illustrates an exemplary environment in which a role-based authorization management system may be implemented. Environment 200 includes an application server 202 and a client computer system 204.

Application server 202 includes a processor 206 and memory 208. An application 210 is stored in memory 208 and executed on processor 206. The authorization policy store 104, authorization interface 106, and authorization manager 108 components of authorization management system 102 are also stored in application server memory 208. In one implementation, a complete or partial copy of the authorization policy store 104 may be cached using application server memory 208 that is associated with an application. In alternate implementations, one or more components of the authorization management system may be stored remotely. For example, in one implementation, authorization policy store 104 may be stored in a remote storage location accessible by application server 204.

Client computer system 204 includes a processor 212 and memory 214. An application user interface 216 is stored in memory 208 and executed on processor 206. Application user interface 216 is a user interface component associated with application 210, which is stored and executed on application server 202.

In the implementation shown, an application administrator defines role-based user permissions through authorization manager 108, which are stored in authorization policy store 104. When a user attempts to perform a function through application UI 216 (or through any other interface that provides access to the application, such as an exposed programmatic interface), application 210 calls an AccessCheck function through authorization interface 106 to verify that the user is authorized to perform the requested function. The AccessCheck function examines the user permissions stored in authorization policy store 104 to determine whether or not the user is authorized to perform the requested application function.

In an exemplary implementation, authorization policy store 104 may be implemented in Microsoft Window Active Directory (AD); as a set of Extensible Markup Language (XML) files; as a set of registry entries using, for example HKey Local Machine (HKLM); or as a structured query language (SQL) database.

Authorization Policy Store

Figure 3:
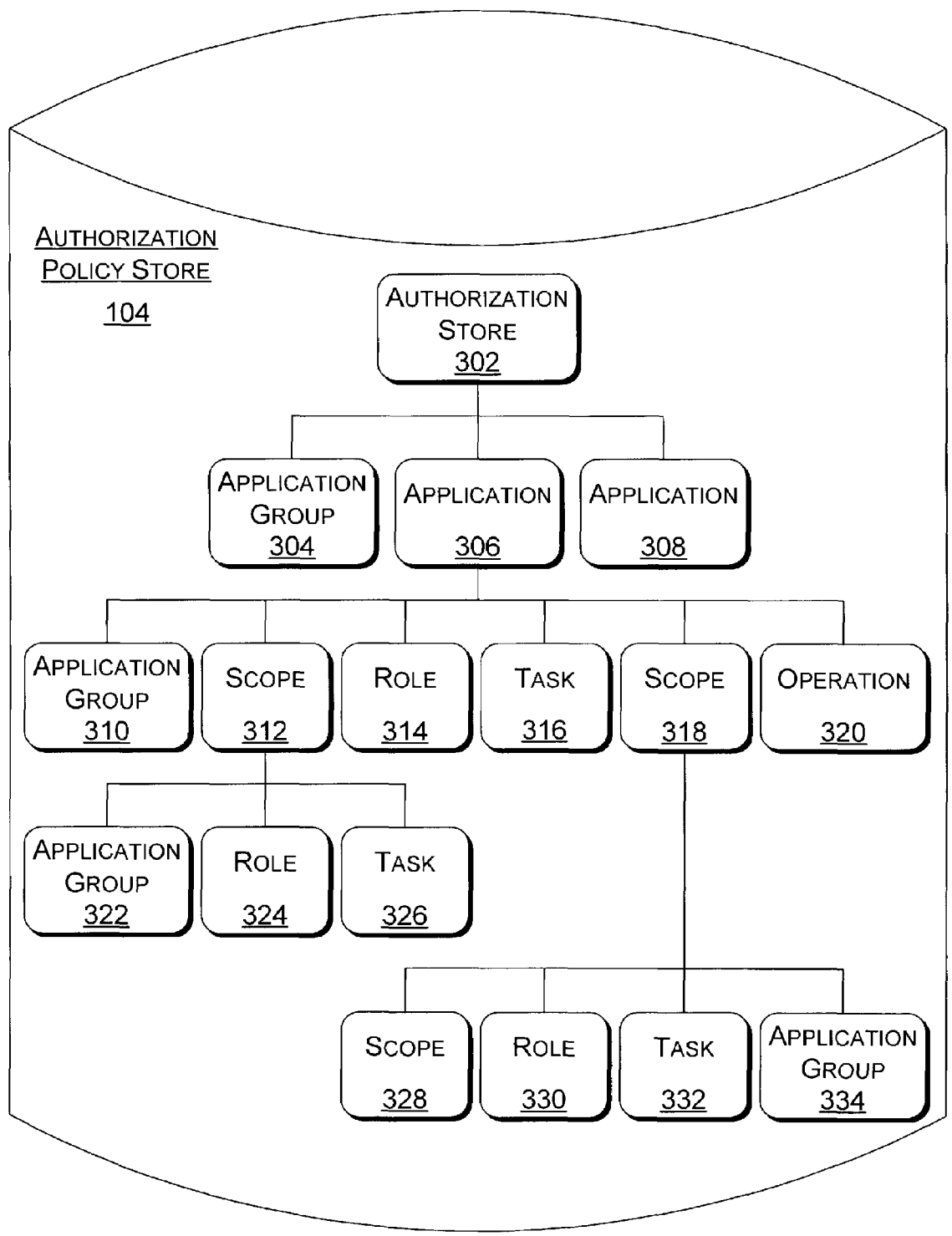
FIG. 3 illustrates an exemplary structure of an authorization policy store.

FIG. 3 illustrates an exemplary structure of an authorization policy store in accordance with one embodiment. Authorization policy store 104 stores data that represents authorization objects and relationships between those objects. The objects and relationships define which users are authorized to perform which operations in association with one or more applications. In an exemplary implementation, the authorization objects are related in a hierarchical structure that is illustrated in FIG. 3. Authorization objects include authorization store objects, application group objects, application objects, operation objects, a task objects, scope objects, and role objects.

An authorization store object is the root object of authorization policy store 104. In this embodiment, an authorization policy store has one and only one authorization store object, which can be a parent object to application group objects and application objects. In the example illustrated in FIG. 3, authorization store object 302 is the root object of policy store 104 and parent object of application group object 304 and application objects 306 and 308.

An application group object represents a collection of users. As a child of an authorization store object, an application group object represents a collection of users for which application permissions are managed using the authorization policy store represented by the parent authorization store object. Illustrated in FIG. 3, application group object 304 represents a collection of users associated with the applications represented by application objects 306 and 308. The application group object is a lowest level object in terms of the hierarchy and may not be a parent object to any other objects.

As a child of an authorization store object, an application object represents an instance of an application for which user permissions are managed using the authorization policy store represented by the parent authorization store object. As shown in FIG. 3, application objects 306 and 308 represent two applications for which user permissions are managed using authorization policy store 104. An application object together with the child objects of the application object define the user authorization policies that apply to a given instance of the application. An application object may be a parent object to one or more application group objects, scope objects, role objects, task objects, and operation objects. This is illustrated in FIG. 3 with application object 306 shown as the parent object to application group object 310, scope objects 312 and 318, role object 314, task object 316, and operation object 320.

As a child of an application object, an application group object represents a collection of users that may be associated with any scope object defined at or below the hierarchical level of the application group object. This is illustrated in FIG. 3 as the relationship between application object 306, application group object 310, and scope objects 312, 318, and 328. Because application group object 310 is a child object of application object 306, the collection of users defined by application group object 310 may be associated with scope object 312, scope object 318, and/or scope object 328 (the scope objects at or below the hierarchical level of application group object 310). The described association between a collection of users and a scope object is defined using a role object, which will be described in further detail below with reference to role objects 314, 324, and 330.

Each operation object is a child of an application object, and represents a particular operation associated with the parent application. As shown in FIG. 3, operation object 320 represents an operation that is associated with the application represented by application object 306. The operation object is a lowest level object in terms of the hierarchy and may not be a parent object to any other objects.

A task object defines a collection of operations. As a child of an application object, a task object represents a collection of operations associated with the parent application. This is illustrated in FIG. 3, in which task object 316 represents a collection of operations that are associated with the application represented by application object 306. The task object is a lowest level object in terms of the hierarchy and may not be a parent object to any other objects.

A scope object defines a collection of other authorization objects. A scope object may be a parent object to one or more application group objects, role objects, and task objects. In one implementation, a scope object may also be a parent object to other scope objects. The child objects of a scope object make up the collection of authorization objects that is the scope. This is illustrated in FIG. 3, with scope object 312 shown as the parent object to application group object 322, role object 324, and task object 326; and scope object 318 shown as the parent object to scope object 328, role object 330, task object 332, and application group object 334. As such, application group object 322, role object 324, and task object 326 all have the same scope, represented by scope object 312; scope object 328, role object 330, task object 332, and application group 334 all have the same scope, represented by scope object 318. In implementations that support scope nesting (one scope object is the parent of another scope object) the child scope inherits authorization policies from the parent scope. In the event of a conflict, a policy associated with the child scope takes precedence over a policy associated with the parent scope.

A role object defines a particular set of operations that can be performed by a particular set of users within a particular scope. A role object that is defined as a child of an application object applies to all scope objects that are children of the same application object. A role that is defined as a child of a scope object applies only to the parent scope. For example, as shown in FIG. 3, role object 314 applies to scope objects 312 and 318; role object 324 applies only to scope object 312; and role object 328 applies only to scope object 318. The role object is a lowest level object in terms of the hierarchy and may not be a parent object to any other objects.

Each authorization object is defined in terms of a set of attribute values. Exemplary sets of attributes for each of the authorization objects shown in FIG. 3 are described below.

TABLE 1

| Authorization Store Object Attributes |
| --- |
| Description |
| Domain Timeout |
| Script Engine Timeout |
| Max Script Engines |
| Generate Audits |
| Application Data |
| Target Machine |
| Apply Store SACL |

Table 1 lists a set of attributes that may be associated with an authorization store object.

The Description attribute stores a comment that describes the authorization policy store.

The Domain Timeout attribute stores a time after a failed domain discovery at which the domain is determined to be unreachable. After the designated time, the system will again attempt to contact a domain controller. In one implementation, the time is stored in milliseconds and defaults to 15000 (15 seconds). If the Domain Timeout has a value of −1, then the system will not attempt to contact a domain controller after an initial failure. The AccessCheck function may need to access a domain controller to execute an LDAP query that may be associated with an application group object. (The AccessCheck function will be described in more detail with reference to FIG. 12; LDAP queries and user groups will be described in more detail with reference to Application Group Object Attributes shown in Table 2.)

The Script Engine Timeout attribute stores a length of time that the AccessCheck function will wait for a BizRule to complete execution before aborting the execution of the BizRule. (BizRules will be described in more detail with reference to the task object attributes shown in FIG. 8. The AccessCheck function will be described in more detail with reference to FIG. 12.) In an exemplary implementation, the time is stored in milliseconds, has a minimum value of 5000 (5 seconds), and defaults to 45000 (45 seconds). If the Script Engine Timeout has a value of −1, then the AccessCheck function will not abort the execution of a BizRule. If the Script Engine Timeout has a value of 0, then the AccessCheck function will not execute any BizRules.

The Max Script Engines attribute stores a maximum number of BizRule script engines that will be cached. In an exemplary implementation, the default value is 120. In the described implementation, a script engine is an instance of an interface, such as an IActiveScript interface, which allows programs to execute Virtual Basic Scripts (VBScripts) or Java Scripts (JScripts).

The Generate Audits attribute stores a boolean value and controls runtime auditing. Runtime auditing refers to audits generated by an application when it uses the authorization policy store to make authorization decisions. In one implementation, if the Generate Audits attribute associated with an application store object has a value of "true", then an application initialization audit will be generated when an application calls an OpenApplication function, specifying that the application to be opened is an application that has an associated application object in the authorization policy store. The application initialization audit records data that indicates what application was opened, when it was opened, and who (or what, such as another application) opened it. The initialization audit is created when the application server boots and begins loading the authorization policy store into memory.

The Application Data attribute is a data field that can be used by an application to store any information.

The Target Machine attribute stores an identifier of a computer where user account resolution is to occur. In an exemplary implementation, the Target Machine attribute is read only and is identifies the computer on which the authorization policy store is physically stored.

The Apply Store SACL attribute stores a boolean value and controls authorization policy store auditing. In an exemplary implementation, policy store auditing is implemented using the native auditing mechanisms for the underlying store. For an authorization store implemented as an XML file, that mechanism is a SACL on the XML file; for an authorization store implemented using Active Directory, that mechanism is a SACL on each individual object. If the Apply Store SACL attribute associated with an application store object has a value of "true", then changes to the application store object and changes to child objects will be audited.

TABLE 2

| Application Group Object Attributes |
| --- |
| Name |
| Description |
| Type |
| Members |
| Non Members |
| LDAP Query |

Table 2 lists a set of attributes that may be associated with an application group object.

The Name attribute stores a name of the application group.

The Description attribute stores a comment describing the application group.

The Type attribute stores a value that indicates whether the application group is a basic application group or a Lightweight Directory Access Protocol (LDAP) query application group. Members of a basic application group are explicitly identified. Members of an LDAP query application group are dynamically determined based on an LDAP query of user attributes. As a result, LDAP query groups require that the user's account is maintained in Active Directory.

The Members attribute stores a static list of users and/or groups that are members of this application group. The Members attribute is used if the Type attribute indicates that the application group is a basic application group and is ignored if the Type attribute indicates that the application group is an LDAP query application group. In an exemplary implementation, a user may be an NT user identified by the user security identifier (SID), and a group may be either an NT group identified by the NT group SID or a group represented by another application group object identified by the value of the application group Name attribute.

The Non Members attribute stores a static list of users and/or groups that are not members of this application group. In an exemplary implementation, the Non Members attribute takes precedence over the Members attribute, so that if a user is identified in both the Members attribute and the Non Members attribute, the user is considered not a member of the application group.

The LDAP Query attribute stores a valid LDAP query that is used to determine whether or not a particular user is a member of the application group. Examples of valid LDAP queries include:
- All members of a "DogLovers" alias—(membersOf=CN=DogLovers,OU=DistributionLists, DC=nwtraders, DC=com)
- All adults—(age>=18)
- All users it Germany—(country=Germany)
- All adults in Germany—(&(age>=18) (country=Germany))

TABLE 3

Application Object Attributes

Name
Description
Authorization Interface CLSID
Application Version
Generate Audits
Application Data Table 3 lists a set of attributes that may be associated with an application object.

The Name attribute stores a name associated with the application. In an exemplary implementation, the following syntax is used to prevent naming collisions:
<Manufacturer><Application>[;<Hosting Machine Name>[;<Application Specific Instance String>]]
where:
<Manufacturer> is the name of the manufacturer of the application (e.g., "Microsoft");
<Application> is the name of the application (e.g., "IIS");
<Hosting Machine Name> is the domain name server (DNS) name of the machine on which the application runs. In one implementation, the hosting machine name may be required if the policy store is not stored on the same machine as the application or if the policy store is not stored in the Active Directory as sub-objects of a machine object. For a replicated application such as a web farm, the hosting machine name may be the name that the replicated entity is known by, such as the web farm name.
<Application Specific Instance String> may be any reasonable text that can be used to distinguish between multiple instances of an application configured on a single machine.

The Description attribute stores a comment describing the application.

The Authorization Interface CLSID attribute stores a string representation of a GUID that is used to support the implementation of application interfaces that allow custom runtime behavior for authorization objects.

The Application Version attribute stores a representation of the version of the application. The Application Version attribute can be used to handle scenarios in which the version of the application affects the data in the authorization policy store.

The Generate Audits attribute stores a boolean value and controls runtime auditing. Runtime auditing refers to audits generated by an application when it uses the authorization policy store to make authorization decisions. In one implementation, if the Generate Audits attribute associated with an application object has a value of "true", then client context creation, client context deletion, and access check audits will be generated for the application.

Client context creation is analogous to log on and indicates that a user is connected to the application. A client context creation audit includes a user name and the date/time that the user connected to the application.

Client context deletion is analogous to logoff, and indicates that a user has disconnected from the application. A client context deletion audit includes a user name and the date/time that the user disconnected from the application.

Access check audits are generated when a user attempts to perform a particular action or operation, and indicate whether the attempted operation succeeds or fails based on the policy. An access check audit includes a user name, an indication of an operation, and a date/time.

The Application Data attribute is a data field that can be used by the application to store any information.

TABLE 4

Operation Object Attributes

Name
Description
Operation ID
Application Data

Table 4 lists a set of attributes that may be associated with an operation object.

The Name attribute stores a name associated with the operation.

The Description attribute stores a comment describing the operation.

The Operation ID attribute stores an application specific value that makes the operation unique to the application.

The Application Data attribute is a data field that can be used by the application to store any information.

As an example, an authorization policy store may be implemented to support a web-based expense application. The application may have the following requirements:
When a user enters the URL of the expense application, the user is able to enter and submit an expense report.
When a user submits an expense report for approval, the user's manager receives an email notification that an expense report is awaiting approval.
When a manager enters an approval URL associated with the expense application, the manager is able to inspect and approve the expense report.
When a manager approves an expense report, the expense report is added to a verification queue.
A verifier can access the verification queue to inspect the report, collect receipts, mark the expense approval-verified, and request a reimbursement.

A single application object may be defined in an authorization policy store to represent the application. In this example, there are no application group objects necessary as roles can be assigned directly to users. Furthermore, scope objects are not described in the context of this example, but could be implemented, for example to insure that users associated with one cost center were not given access to data associated with another cost center.

To support the requirements listed above, the following operations may be defined as operation objects associated with the application object that represents the web-based expense application:

Operation ID=1; Name=ExecuteExpenseControls; Description=Use controls to fill out an expense form.
Operation ID=2; Name=ExecuteApprovalControls; Description=Use controls to approve an expense form.
Operation ID=3; Name=RetrieveExpenseForm; Description=Retrieve a requested expense form from a database.
Operation ID=4; Name=SaveExpenseForm; Description=Save and expense form to the local machine.
Operation ID=5; Name=EnqueApproval; Description=Copy a completed expense form into approval queue.
Operation ID=6; Name=DequeApproval; Description=Remove an expense form from the approval queue.
Operation ID=7; Name=SendRequestNotification; Description=Send email to a manager requesting approval.
Operation ID=8; Name=SendApprovalNotification; Description=Send email notification of approval.
Operation ID=9; Name=ApproveExpense; Description=Mark an expense form as Approved.
Operation ID=10; Name=VerifyApproval; Description=Mark an expense form as Approval-Verified.
Operation ID=11; Name=SetExpenseLimit; Description=Set expense limit amounts that roles can approve.
Operation ID=12; Name=FwdReimbursement; Description=Send an email message to accounts payable.
Operation ID=13; Name=ReadApprovals; Description=Read expense forms in approval queue or archive.
Operation ID=14; Name=ReadArchive; Description=Read expense forms in approval archive.

TABLE 5

Task Object Attributes

Name
Description
Operations
Tasks
BizRule
BizRule Language
BizRule Imported Path
Is Role Definition
Application Data Table 5 lists a set of attributes that may be associated with a task object. In an exemplary implementation, a task may represent a collection of operations and/or other tasks and is presented as the lowest level of permissions that makes sense from a user perspective or a task may be used to define BizRule.

In an alternate implementation, a task may be flagged as a Role Definition, which is a convenient collection of operations that can be referenced by more than one role. As such, the task object can act as a template for the operations allowed by that set of roles.

The Name attribute stores a name associated with the task. In an exemplary implementation, the name of a task associated with an application must be unique among the other task names and operation names associated with the application.

The Description attribute stores a comment describing the task.

The Operations attribute stores a list of one or more operations that a user is granted access to perform when the user is granted access to perform the task.

The Tasks attribute stores a list of one or more other tasks that a user is granted access to perform when the user is granted access to perform the task.

The BizRule attribute stores the text of a script implementing a business rule. A BizRule can be used to associate a dynamic condition with a task. For example, a user may be authorized to approve an expense provided that the expense is below a particular amount, say $100.

The BizRule Language attribute stores an identifier of the language associated with the value of the BizRule attribute. In an exemplary implementation, BizRules may be written using Virtual Basic Script (VBScript) or Java Script (JScript).

An example JScript BizRule to insure that the time of day is between 9 AM and 5 PM is:

```
AccessCheck.BusinessRuleResult = false;
dt = new Date( );
hour = dt.getHours( );
if (hour > 9 && hour < 17)
{
    AccessCheck.BusinessRuleResult = true;
}
```

An example VBScript BizRule to insure that an amount that is passed in as a parameter is less than 500 is:

```
Dim Amount
AccessCheck.BusinessRuleResult = FALSE
Amount = AccessCheck.Get Parameter ("ExpAmount")
If Amount < 500 then
    AccessCheck.BusinessRuleResult = True
```

The BizRule Imported Path attribute stores the name of a file from which the BizRule attribute value was imported. In an exemplary implementation, the authorization manager 108 provides a mechanism for synchronizing the value of the BizRule attribute with the contents of the file.

The Is Role Definition attributes stores a Boolean values that indicates whether or not the task is to be viewed as a role definition. In an exemplary implementation, a value of true indicates that the task is also a role definition. If a task is identified as a role definition, then the task is presented differently to an application administrator through the authorization manager 108, providing a mechanism for associating the role definition with multiple roles. However, there is no functional difference between a task and a role definition.

The Application Data attribute is a data field that can be used by the application to store any information.

For example, given the web-based expense application described above with reference to operation objects, the following tasks may be defined as task objects associated with the application object that represents the web-based expense application:

Name=Create Report; Operations=(1, 3, 4); Description=Routines to fill out an expense report.

Name=Submit Report; Operations=(5, 7); Description=Routines that upload expense report to pending state and send email to manager.

Name=View Report; Operations=(1, 2, 3); Description=Routines that display a pending report.

Name=Approve Report; Operations=(2, 3, 5, 8, 9); BizRule Language=VBScript; BizRule=
Dim Amount
AccessCheck.BusinessRuleResult=FALSE
Amount=AccessCheck.GetParameter("Amount")
Limit=AccessCheck.GetParameter("Limit")
If Amount<Limit then AccessCheck.BusinessRuleResult=TRUE;
Description=Routines that cause expense report to move from pending state to approved state and send email to submitter;

Name=Verify Approval; Operations=(2, 8, 9, 12); Description=Operations required to mark an expense form as Approval-Verified and forward a reimbursement request to accounts payable.

Name=Audit Report; Operations=(13); Description=Allows reading of reports in approval queue and approval archive.

Name=Config Limits; Operations=(11); Description=Allows the setting of approval limits for employees and managers.

TABLE 6

Scope Object Attributes

Name
Description
Application Data

Table 6 lists a set of attributes that may be associated with a scope object.

The Name attribute stores a name associated with the scope.

The Description attribute stores a comment describing the scope.

The Application Data attribute is a data field that can be used by the application to store any information.

TABLE 7

Role Object Attributes

Name
Description
Members
Operations
Tasks
Application Data

Table 7 lists a set of attributes that may be associated with a role object.

The Name attribute stores a name associated with the role object.

The Description attribute stores a comment describing the role.

The Members attribute stores a list of values that identify a set of users that this role applies to. The values may reference users or groups. Similar to the Members attribute of the application group object, in an exemplary implementation, users may include NT users and groups may include NT groups and/or application group objects.

The Operations attribute stores a list of references to operation objects that identify the operations that can be performed by the users defined by the Members attribute on the objects defined by the scopes that the role applies to.

The Tasks attribute stores a list of references to task objects that identify tasks that can be performed by the users defined by the Members attribute on the objects defined by the scopes that the role applies to.

The Application Data attribute is a data field that can be used by the application to store any information.

For example, given the web-based expense application described above with reference to operation objects and task objects, the following roles may be defined as role objects associated with the application object that represents the web-based expense application:

Name=User; Description=All Employees; Members=SID associated with a Windows NT group that represents all employees; Tasks=(Submit Report, View Report). [need to somehow specify the scope as being reports associated with the user]

Name=Manager; Description=LDAP query group that verifies user job title and number of direct reports; Members=(&(userTitle="Manager")(numReports>0)) [this should be identified as an application group]; Tasks= (Submit Report, View Report, Approve Report). [Also need to somehow specify scope as being reports associated with a direct report]

Name=Verifier; Description=All user's who's job it is to verify each expense report; Members=Basic Application group with static lists of members; Tasks=(View Report, Verify Approval).

Name=Expense Admin; Description=Members of the expense accounting department; Members=SID associated with an NT group that represents employees in the expense accounting department; Tasks=(View Report, Delete Report, Config Limits).

Authorization Interface

Figure 4:
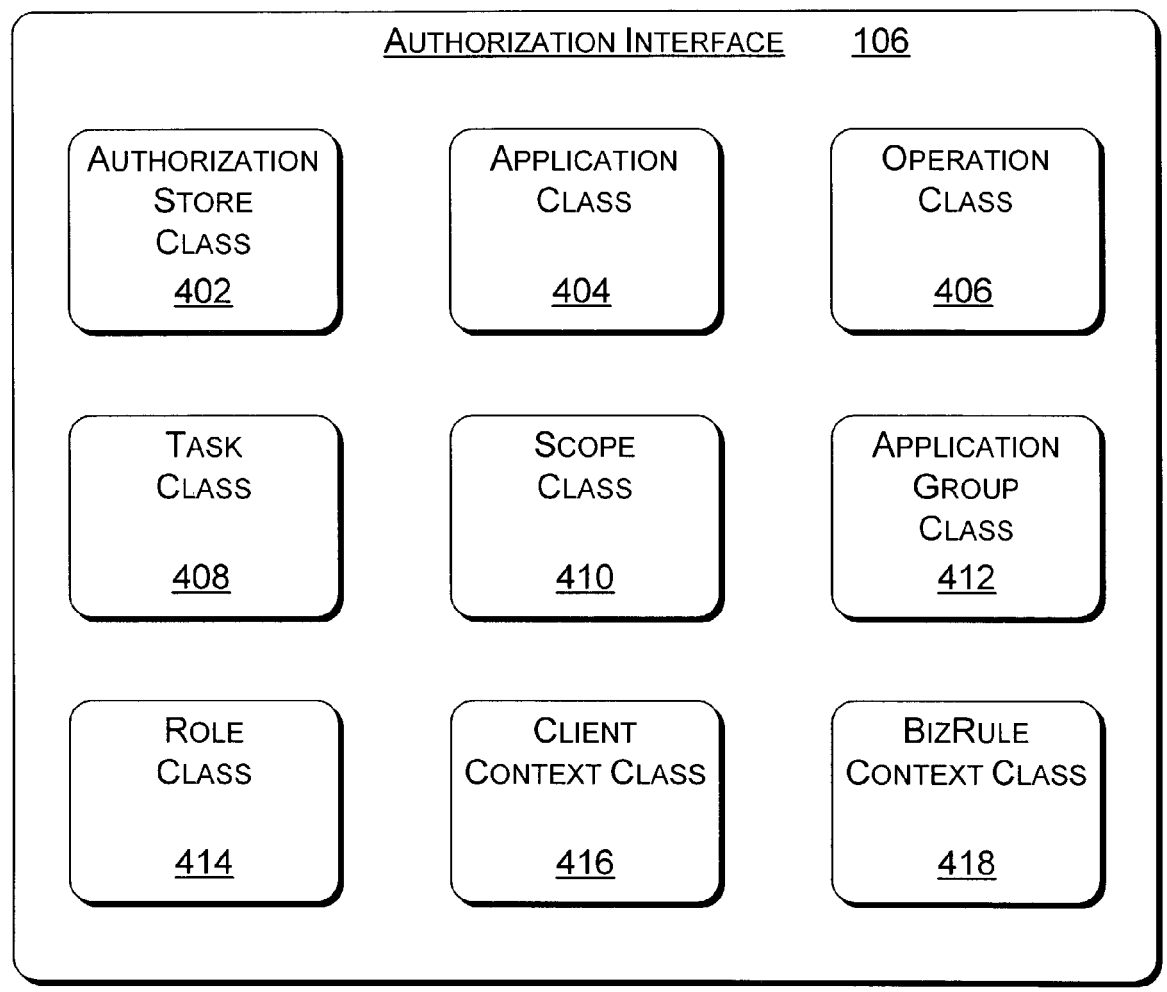
FIG. 4 illustrates an exemplary set of classes that make up an authorization interface.

Authorization interface 106, illustrated in FIG. 2, provides a mechanism for application 210 to verify user authorization to perform an application function based on the role-based user permissions stored in authorization policy store 104. The authorization interface may be implemented to include a set of classes with associated methods. FIG. 4 illustrates an exemplary set of classes that make up authorization interface 106.

In an exemplary implementation, authorization interface 106 includes an authorization store class 402, application class 404, operation class 406, task class 408, scope class 410, application group class 412, role class 414, client context class 416, and BizRule context class 418.

Each class is defined in terms of a set of methods. Exemplary sets of methods for each of the classes shown in FIG. 4 are described below.

TABLE 8

Authorization Store Class Methods

| | |
|---|---|
| Initialize | DeleteApplication |
| UpdateCache | ApplicationGroups |
| Delete | CreateApplicationGroup |
| Description | OpenApplicationGroup |
| ApplicationData | DeleteApplicationGroup |
| Applications | Submit |
| OpenApplication | GetProperty |
| CreateApplication | SetProperty |

Table 8 lists an exemplary set of methods associated with authorization store class 402. Authorization store class 402 is used by application 210 or authorization manager 108 to initialize a policy store.

The Initialize method loads all defined application instances into memory and provides enumeration API access to application objects stored in authorization policy store 104.

The UpdateCache method updates the cache of objects and object attributes to match the objects and attributes stored in the underlying authorization policy store.

The Delete method deletes the authorization policy store that is created or opened by the current authorization store object, returning the authorization store object to an un-initialized state.

The Description method provides read and/or write access to the description attribute of the current authorization store object.

The ApplicationData method provides read and/or write access to the application data attribute of the current authorization store object.

The Applications method creates an application collection object that enumerates application objects stored in the authorization policy store.

The OpenApplication method opens an application object based on an application name parameter.

The CreateApplication method creates a new application object that is a child of the current authorization store object.

The DeleteApplication method removes an application object from the authorization policy store based on an application name parameter. All child objects of the application object are also removed.

The ApplicationGroups method creates an application group collection object that enumerates application group objects stored in the authorization policy store.

The CreateApplicationGroup method creates a new application group object that is a child of the current authorization store object.

The OpenApplicationGroup method opens an application group object based on an application group name parameter.

The DeleteApplicationGroup method removes an application group object from the authorization policy store based on an application group name parameter.

The Submit method persists any changes to the authorization policy store.

The GetProperty method returns the value of an authorization store object attribute based on an attribute name parameter.

The SetProperty method sets the value of an authorization store object attribute based on an attribute name parameter and an attribute value parameter.

TABLE 9

Application Class Methods

| | |
|---|---|
| Name | Tasks |
| Description | OpenTask |
| ApplicationData | CreateTask |
| GetProperty | DeleteTask |
| SetProperty | ApplicationGroups |
| Scopes | DeleteApplicationGroup |
| OpenScope | Roles |
| CreateScope | OpenRole |
| DeleteScope | CreateRole |
| Operations | DeleteRole |
| OpenOperation | InitializeClientContextFromToken |
| CreateOperation | InitializeClientContextFromName |
| DeleteOperation | InitializeClientContextFromStringSID |
| | Submit |

Table 9 lists an exemplary set of methods associated with application class 404. Application class 404 is used by application 210 or authorization manager 108 to access the objects in authorization policy store 104 that are associated with a particular application.

The Name method provides read and/or write access to the name attribute of the current application object.

The Description method provides read and/or write access to the description attribute of the current application object.

The ApplicationData method provides read and/or write access to the description attribute of the current application object.

The GetProperty method returns the value of an application object attribute based on an attribute name parameter.

The SetProperty method sets the value of an application object attribute based on an attribute name parameter and an attribute value parameter.

The Scopes method creates a scope collection object that enumerates scope objects that are associated with the application object.

The OpenScope method opens a scope object based on a scope name parameter.

The CreateScope method creates a new scope object that is a child of the current application object.

The DeleteScope method removes a scope object from the authorization policy store based on a scope name parameter. Child objects of the deleted scope are also removed.

The Operations method creates an operation collection object that enumerates operation objects that are associated with the application object.

The OpenOperation method opens an operation object based on an operation name parameter.

The CreateOperation method creates a new operation object that is a child of the current application object.

The DeleteOperation method removes an operation object from the authorization policy store based on an operation name parameter.

The Tasks method creates a task collection object that enumerates task objects that are associated with the application object.

The OpenTask method opens a task object based on a task name parameter.

The CreateTask method creates a new task object that is a child of the current application object.

The DeleteTask method removes a task object from the authorization policy store based on a task name parameter.

The ApplicationGroups method creates an application group collection object that enumerates application group objects that are associated with the application object.

The OpenApplicationGroup method opens an application group object based on an application group name parameter.

The CreateApplicationGroup method creates a new application group object that is a child of the current application object.

The DeleteApplicationGroup method removes an application group object from the authorization policy store based on an application group name parameter.

The Roles method creates a role collection object that enumerates role objects that are associated with the application object.

The OpenRole method opens a role object based on a role name parameter.

The CreateRole method creates a new role object that is a child of the current application object.

The DeleteRole method removes a role object from the authorization policy store based on a role name parameter.

The InitializeClientContextFromToken method creates a client context object based on a client token parameter.

The InitializeClientContextFromName method creates a client context object based on a (domain name, client name) parameter.

The InitializeClientContextFromStringSID method creates a client context object based on a SID parameter, where the SID represents the client identity. In one implementation, this method may be used to generate client context objects for entities that are associated with any operating system by associating a SID with a string identifier for an entity.

The Submit method persists any changes to the policy store.

TABLE 10

| Operation Class Methods |
| --- |
| Name |
| Description |
| ApplicationData |
| GetProperty |
| SetProperty |
| Submit |

Table 10 lists an exemplary set of methods associated with operation class 406. Operation class 406 is used by application 210 or authorization manager 108 to define the operations that are associated with the application.

The Name method provides read and/or write access to the name attribute of the current operation object.

The Description method provides read and/or write access to the description attribute of the current operation object.

The ApplicationData method provides read and/or write access to the application data attribute of the current operation object.

The GetProperty method returns the value of an operation object attribute based on an attribute name parameter.

The SetProperty method sets the value of an operation object attribute based on an attribute name parameter and an attribute value parameter.

The Submit method persists any changes to the policy store.

TABLE 11

| Task Class Methods |
| --- |
| Name |
| Description |
| ApplicationData |

TABLE 11-continued

| Task Class Methods |
| --- |
| GetProperty |
| SetProperty |
| Submit |

Table 11 lists an exemplary set of methods associated with task class 408. Task class 408 is used by application 210 or authorization manager 108 to define the tasks that are associated with the application.

The Name method provides read and/or write access to the name attribute of the current task object.

The Description method provides read and/or write access to the description attribute of the current task object.

The ApplicationData method provides read and/or write access to the application data attribute of the current task object.

The GetProperty method returns the value of a task object attribute based on an attribute name parameter.

The SetProperty method sets the value of a task object attribute based on an attribute name parameter and an attribute value parameter.

The Submit method persists any changes to the policy store.

TABLE 12

| Scope Class Methods | |
| --- | --- |
| Name | OpenRole |
| Description | CreateRole |
| ApplicationData | DeleteRole |
| GetProperty | Tasks |
| SetProperty | OpenTask |
| ApplicationGroups | CreateTask |
| OpenApplicationGroup | DeleteTask |
| CreateApplicationGroup | Submit |
| DeleteApplicationGroup | CanBeDelegated |
| Roles | BizRulesWritable |

Table 12 lists an exemplary set of methods associated with scope class 410. Scope class 410 is used by application 210 or authorization manager 108 to define a collection of objects that are associated with the application.

The Name method provides read and/or write access to the name attribute of the current scope object.

The Description method provides read and/or write access to the description attribute of the current scope object.

The ApplicationData method provides read and/or write access to the application data attribute of the current scope object.

The GetProperty method returns the value of a scope object attribute based on an attribute name parameter.

The SetProperty method sets the value of a scope object attribute based on an attribute name parameter and an attribute value parameter.

The ApplicationGroups method creates an application group collection object that enumerates application group objects that are associated with the scope object.

The OpenApplicationGroup method opens an application group object based on an application group name parameter.

The CreateApplicationGroup method creates a new application group object that is a child of the current scope object.

The DeleteApplicationGroup method removes an application group object from the authorization policy store based on an application group name parameter.

The Roles method creates a role collection object that enumerates role objects that are associated with the current scope object The Roles method creates a role collection object that enumerates role objects that are associated with the current scope object.

The OpenRole method opens a role object based on a role name parameter.

The CreateRole method creates a new role object that is a child of the current scope object.

The DeleteRole method removes a role object from the authorization policy store based on a role name parameter.

The Tasks method creates a task collection object that enumerates task objects that are associated with the current scope object.

The OpenTask method opens a task object based on a task name parameter.

The CreateTask method creates a new task object that is a child of the current scope object.

The DeleteTask method removes a task object from the authorization policy store based on a task name parameter.

The Submit method persists any changes to the policy store.

The CanBeDelegated method returns "True" if no task under the scope has a BizRule defined or if the scope is already delegated (PolicyAdmins!=NULL). Through the use of BizRules, an administrator may elevate their level of access privileges. By preventing the delegation of a scope with BizRules, delegated administrators (who do not have explicit authorization to access a particular scope) are prevented from elevating their level of access privilege through a BizRule.

The BizRulesWritable method returns "True" if the scope is not delegated (PolicyAdmins==NULL) and the scope is writable (Writable is TRUE). This provides a mechanism for a user interface to determine whether or not a scope may be modified. For example, if the scope has been delegated or if the current user does not have authorization to access the scope, then the scope should not be modified.

TABLE 13

Application Group Class Methods

Name
Description
GetProperty
SetProperty
Submit

Table 13 lists an exemplary set of methods associated with application group class 412. Application group class 412 is used by application 210 or authorization manager 108 to define a group of users associated with the application.

The Name method provides read and/or write access to the name attribute of the current application group object.

The Description method provides read and/or write access to the description attribute of the current application group object.

The GetProperty method returns the value of an application group object attribute based on an attribute name parameter.

The SetProperty method sets the value of an application group object attribute based on an attribute name parameter and an attribute value parameter.

The Submit method persists any changes to the policy store.

TABLE 14

Role Class Methods

Name
Description
ApplicationData
GetProperty
SetProperty
Submit

Table 14 lists an exemplary set of methods associated with role class 414. Role class 414 is used by application 210 or authorization manager 108 to define a set of operations that can be performed by a particular set of users within a particular scope.

The Name method provides read and/or write access to the name attribute of the current role object.

The Description method provides read and/or write access to the description attribute of the current role object.

The ApplicationData method provides read and/or write access to the application data attribute of the current role object.

The GetProperty method returns the value of a role object attribute based on an attribute name parameter.

The SetProperty method sets the value of a role object attribute based on an attribute name parameter and an attribute value parameter.

The Submit method persists any changes to the policy store.

TABLE 15

Client Context Class Methods

GetBusinessRuleString
RoleForAccessCheck
AccessCheck
GetProperty
GetRoles

Table 15 lists an exemplary set of methods associated with client context class 416. Client context class 416 is used by application 210 or authorization manager 108 to maintain a representation of a particular client. The application instantiates this class to be used to determine whether or not the client has access to a particular object. In an exemplary implementation, the application may cache this class and use it to perform multiple access checks.

The GetBusinessRuleString method returns the value of the BusinessRuleString attribute of a BizRule context class object. The BusinessRuleString attribute is described below with reference to the BizRule context class.

The RoleForAccessCheck method specifies a particular role that should be used by the AccessCheck method. If RoleForAccessCheck returns a Null string, then all roles will be checked.

The AccessCheck method is called by the application to determine whether or not a particular user is authorized to perform a particular function. A more detailed description of an exemplary AccessCheck method is described below with reference to FIGS. 6-11.

The GetProperty method returns information about the client based on a property ID parameter that identifies a particular client property.

The GetRoles method returns a list of roles within a given scope that the user is a member of.

TABLE 16

BizRule Context Class Methods

BusinessRuleResult (Attribute)
BusinessRuleString (Attribute)
GetParameter

Table 16 lists an exemplary set of methods associated with BizRule context class 418. BizRule context class 418 is used by application 210 or authorization manager 108 to determine information associated with the application operation being performed. The client context class 416 AccessCheck method instantiates the BizRule context class 418 before calling a BizRule script.

The BusinessRuleResult attribute is used to indicate whether or not the user is authorized to perform the requested task based on a BizRule. The attribute is set when the BizRule script executes.

The BusinessRuleString attribute is a value that is returned to the calling application. It may be set by a BizRule script, for example, to indicate a reason for not grating a user authorization to perform a requested task.

The GetParameter method is called by a BizRule script to retrieve parameters passed into the AccessCheck method. The parameter values may be used by the BizRule script to determine whether or not to grant a user authorization to perform the requested task.

Methods for Verifying User Authorization

Role-based user authorization may be described in the general context of computer-executable instructions, such as application modules, being executed by a computer. Generally, application modules include routines, programs, objects, components, data structures, etc. that perform particular tasks or implement particular abstract data types. In the described exemplary implementation, role-based user authorization is implemented using methods associated with authorization objects. Role-based user authorization may also be implemented using other types of programming techniques, and may be implemented in distributed computing environments where tasks are performed by remote processing devices that are linked through a communications network. In a distributed computing environment, application modules may be located in both local and remote computer storage media including memory storage devices.

Figure 5:
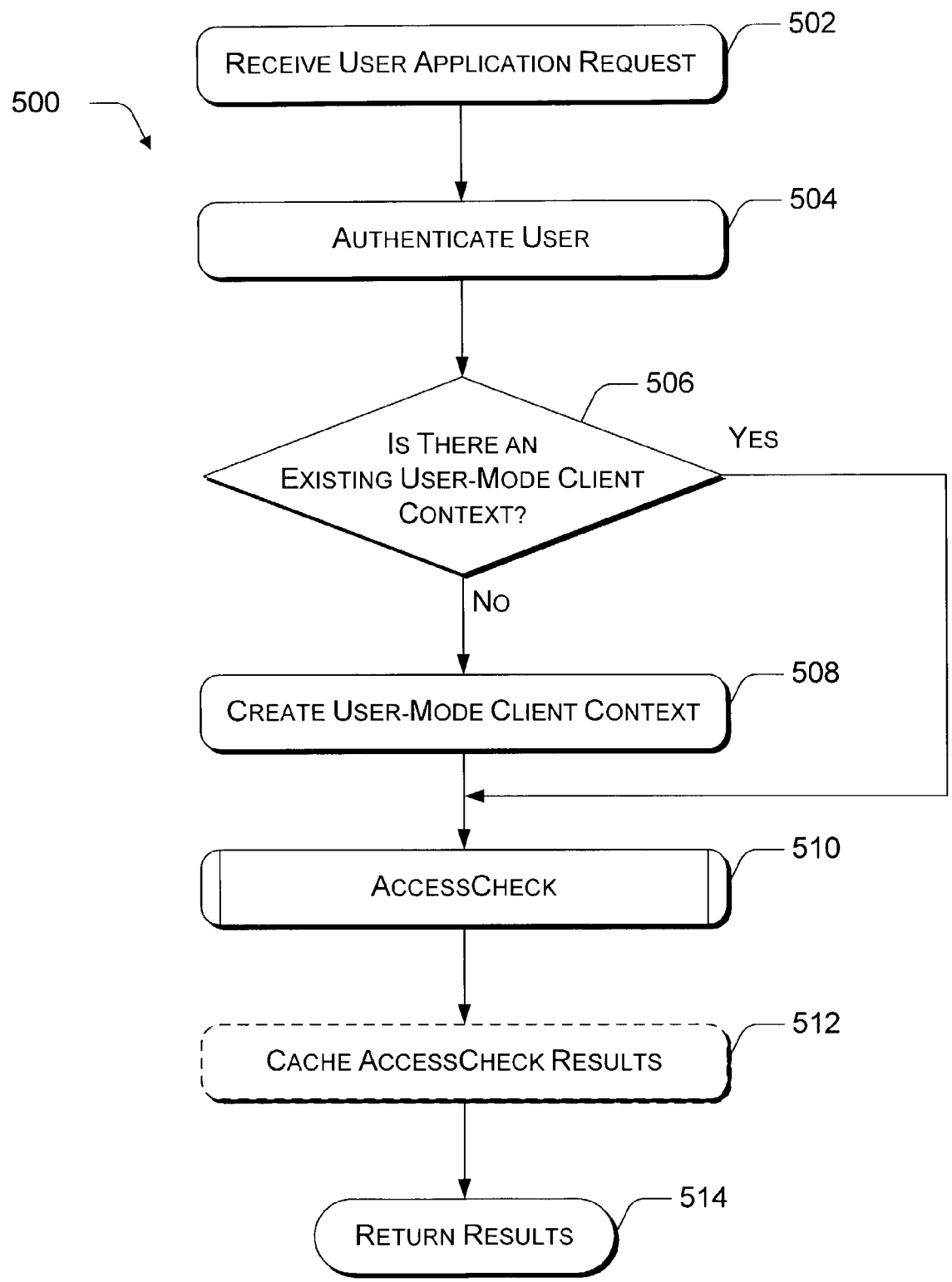
FIG. 5 illustrates a method performed by an authorization interface to verify user authorization to perform an operation in association with an application.

FIG. 5 illustrates a method 500 performed by an authorization interface to verify user authorization to perform an operation in association with an application. The method will be described with reference to exemplary components illustrated in FIG. 2.

At block 502, authorization interface 106 receives a user request to connect to and/or perform a function associated with application 210 through application UI 216.

At block 504, application server 202 authenticates the user using any known authentication process.

At block 506, authorization interface 106 determines whether or not there is an existing user-mode client context that represents the user. If there is an existing user-mode client context associated with the user (the "Yes" branch from block 506), then the method continues at block 510. If there is not an existing user-mode client context associated with the user (the "No" branch from block 506), then the method continues at block 508.

At block 508, authorization interface 106 creates a user-mode client context that represents the user, and stores the client context in a memory area that is private to the application. A user-mode client context is a data structure that contains a list of entities that are associated with the user. The entities may include, for example, a user SID and one or more NT group SIDs identifying NT groups that the user is a member of. The user-mode client context object is created, for example by calling the InitializeClientContextFromToken method, InitializeClientContextFromName method, or InitializeClientContextFromStringSID method associated with the application object that represents the application 210. The InitializeClientContext methods are described above with reference to FIG. 13.

At block 510, authorization interface 106 executes an AccessCheck function to determine whether the user has authorization to perform the function requested through the application. For example, the application calls the AccessCheck method associated with the ClientContext object that was initialized as described above with reference to block 508. An exemplary AccessCheck method will be described in detail below with reference to FIGS. 6-11.

At block 512, the authorization interface may optionally cache the results of the AccessCheck method to potentially reduce processing time associated with future calls to the AccessCheck method. For example, caching the AccessCheck method results may include adding to the user-mode client context, identifiers associated with application groups of which the user is a member.

At block 514 authorization interface 106 returns the results of the AccessCheck method to requesting application 210. Application 210 then determines whether or not to allow the user to perform the requested function based on the results of the AccessCheck method.

Exemplary AccessCheck Method

Figure 6:
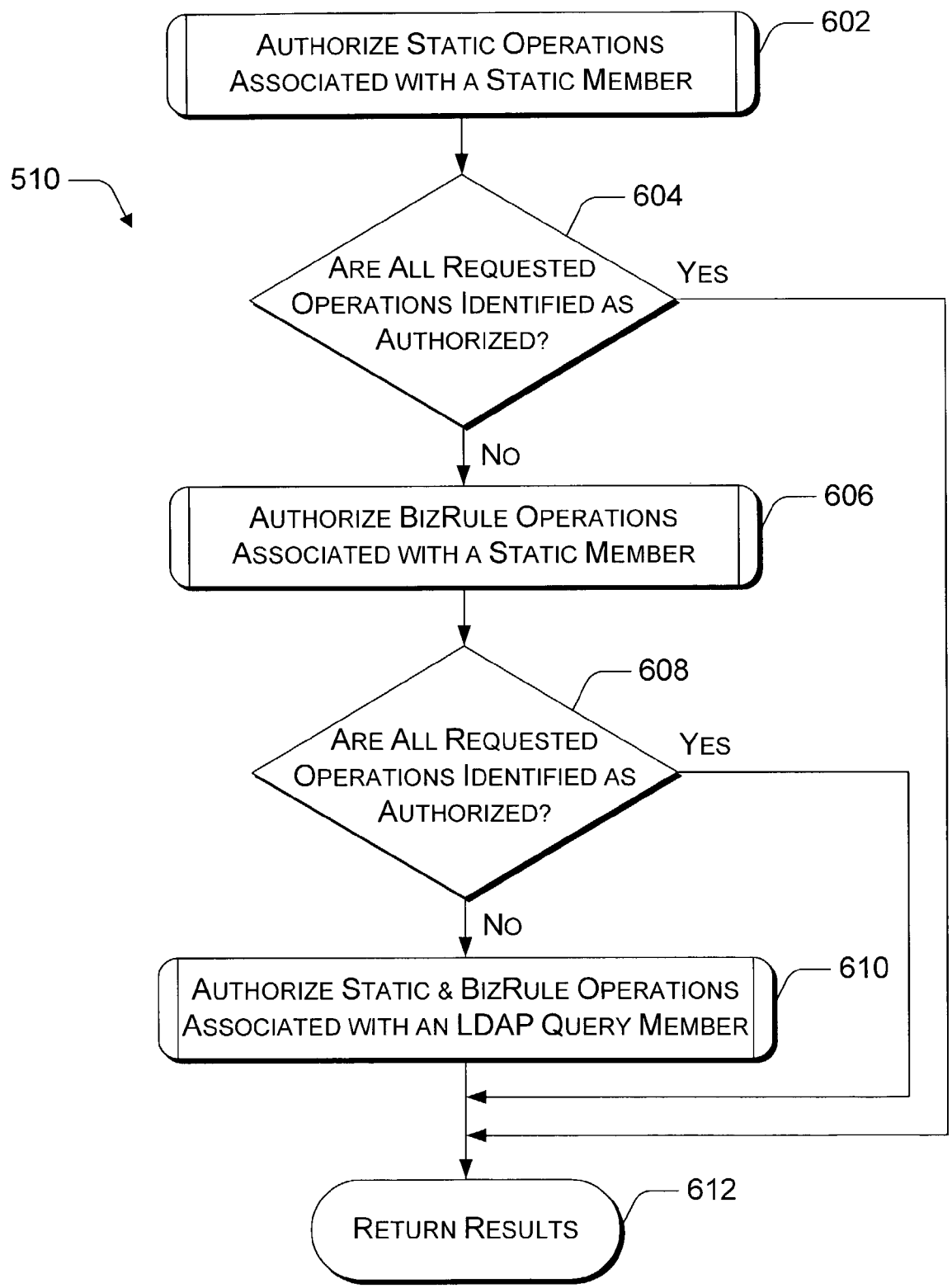
FIG. 6 illustrates an exemplary AccessCheck method that verifies a user's authorization to perform an operation in association with an application.

FIG. 6 illustrates an exemplary AccessCheck method 510 that verifies a user's authorization to perform an operation in association with an application. The AccessCheck method receives as input parameters a scope array, an operations array, an array of BizRule name/value pairs, and an array of BizRule interface name/value pairs. The array of BizRule name/value pairs is available for use as input parameters to BizRule scripts as appropriate. The array of BizRule interface name/value pairs allows application COM interfaces to be specified. The specified COM interfaces can then be called from within a BizRule.

At block 602, the AccessCheck method authorizes any requested operations that are represented by statically defined operation objects associated with a role in which the user is a statically defined member. A method for authorizing static operations associated with a static member is described in further detail with respect to FIG. 7.

At block 604, the AccessCheck method determines whether or not all requested operations have been authorized. If all requested operations have been authorized, then at block 612 (the "Yes" branch from block 604), the AccessCheck method returns the authorization results indicating that the user is authorized to perform all of the requested operations.

At block 606 (the "No" branch from block 604), the function authorizes any requested operations that are represented by a BizRule task object associated with a role in which the user is a statically defined member. A method for authorizing BizRule operations associated with a static member is described in further detail with respect to FIG. 9.

At block 608, the AccessCheck method determines whether or not all requested operations have been authorized. If all requested operations have been authorized, then at block 612 (the "Yes" branch from block 608), the AccessCheck method returns the authorization results indicating that the user is authorized to perform all of the requested operations.

At block 610 (the "No" branch from block 608), the AccessCheck method authorizes any requested operations that are represented by statically defined operation objects or BizRule task objects associated with an LDAP query application group in which the user is a member. A method for authorizing static and BizRule operations associated with an LDAP query member is described in further detail with respect to FIG. 11.

At block 612, the AccessCheck method returns the authorization results.

Authorize Static Operations Associated with a Static Member

Figure 7:
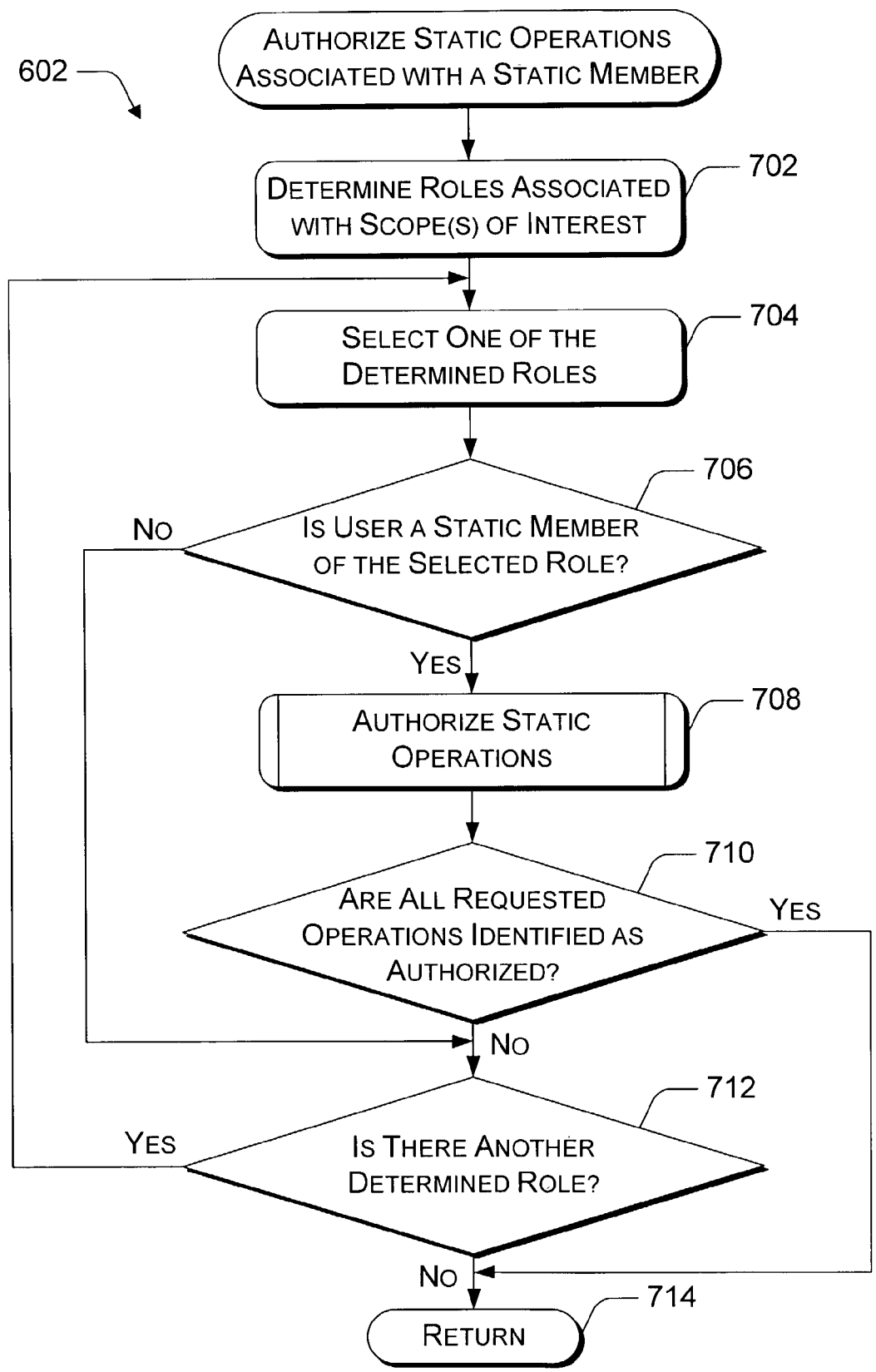
FIG. 7 illustrates an exemplary method for authorizing static operations associated with a static member.

FIG. 7 illustrates an exemplary method 602 for authorizing static operations associated with a static member.

At block 702, the method identifies role objects that are associated with one or more scope(s) of interest as indicated by the value of the scope array input parameter.

At block 704, the method selects one of the role objects identified at block 702.

At block 706, the method determines whether or not the user is a statically defined member associated with the selected role object by comparing the user-mode client context with the role object Members attribute. If results of a previous call to AccessCheck have been cached, the user-mode client context may include identifiers associated with roles and/or application groups. Determining whether or not the user is a member of a role may be as straightforward as matching an SID, role name, or application group name in the user-mode client context with a role name or with an SID or application group name in the Members attribute of a role. On the other hand, determining whether or not the user is a member of a role may involve iteratively examining the Member attributes of other application group objects that are identified in the selected role object Member attribute. If it is determined that the user is not a statically defined member of the selected role object (the "No" branch from block 706), then the method continues at block 712. If it is determined that the user is a statically defined member of the selected role object (the "Yes" branch from block 706), then the method continues at block 708.

At block 708, the method authorizes requested operations that are represented by statically defined operation objects that are associated with the selected role object. A method for authorizing static operations is described in further detail with respect to FIG. 8.

At block 710, the method determines whether or not all of the requested operations have been identified as being authorized. If it is determined that all of the requested operations are authorized (the "Yes" branch from block 710), then at block 714, the method returns. If it is determined that not all of the requested operations have been identified as being authorized (the "No" branch from block 710), then the method continues at block 712.

At block 712, the method determines whether or not there is another role object that was identified at block 702, but that has not been selected at block 704. If it is determined that there is at least one role object that was identified but that has not been selected (the "Yes" branch from block 712), then the function continues at block 704, selecting another one of the role objects identified in block 702. If it is determined that all of the role objects that were identified at block 702 have been selected through one or more iterations at block 704 (the "No" branch from block 712), then at block 714, the method returns.

Authorize Static Operations

Figure 8:
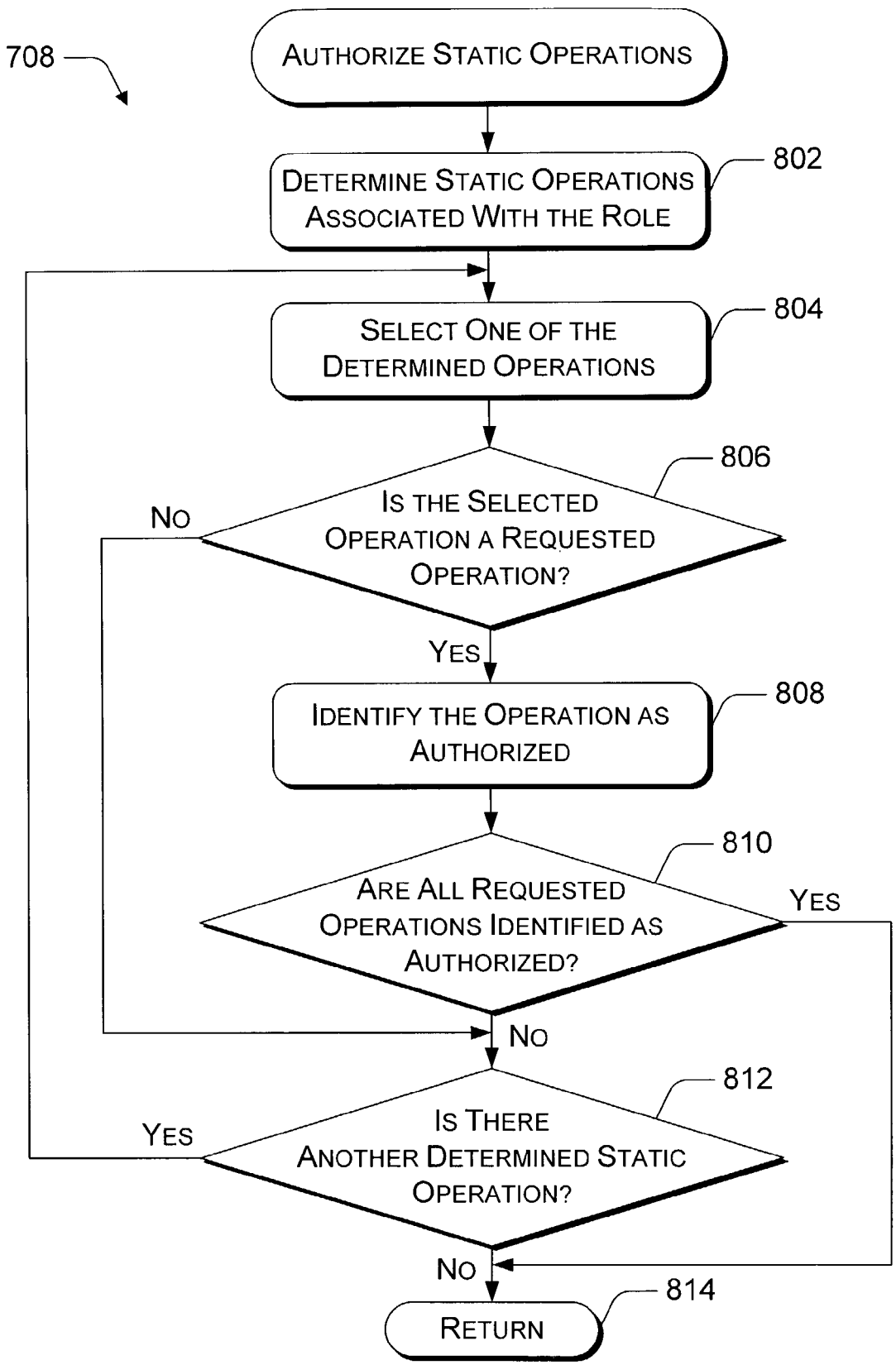
FIG. 8 illustrates an exemplary method for authorizing static operations associated with an identified role object.

FIG. 8 illustrates an exemplary method 708 for authorizing static operations associated with an identified role object.

At block 802, the method identifies statically defined operation objects that are associated with the role object selected at block 704 as described above.

At block 804, the method selects one of the operation objects identified at block 802.

At block 806, the method determines whether or not the operation object selected at block 804 represents a requested operation. If it is determined that the selected operation object does not represent a requested operation (the "No" branch from block 806), then the method continues at block 812. If it is determined that the selected operation object does represent a requested operation (the "Yes" branch from block 805), then the method continues at block 808.

At block 808, the method identifies as authorized the requested operation that is represented by the selected operation object.

At block 810, the method determines whether or not all of the requested operations have been identified as being authorized. If it is determined that all of the requested operations are authorized (the "Yes" branch from block 810), then at block 814, the method returns. On the other hand, if it is determined that not all of the requested operations have been identified as being authorized (the "No" branch from block 810), then the method continues at block 812.

At block 812, the method determines whether or not there is another operation object that was identified at block 802, but that has not been selected at block 804. If it is determined that there is at least one operation object that was identified but that has not been selected (the "Yes" branch from block 812), then the method continues at block 804, selecting another one of the operation objects identified in block 802. On the other hand, if it is determined that all of the operation objects that were identified at block 802 have been selected through one or more iterations at block 804 (the "No" branch from block 812), then at block 814, the method returns.

Authorize BizRule Operations Associated with a Static Member

Figure 9:
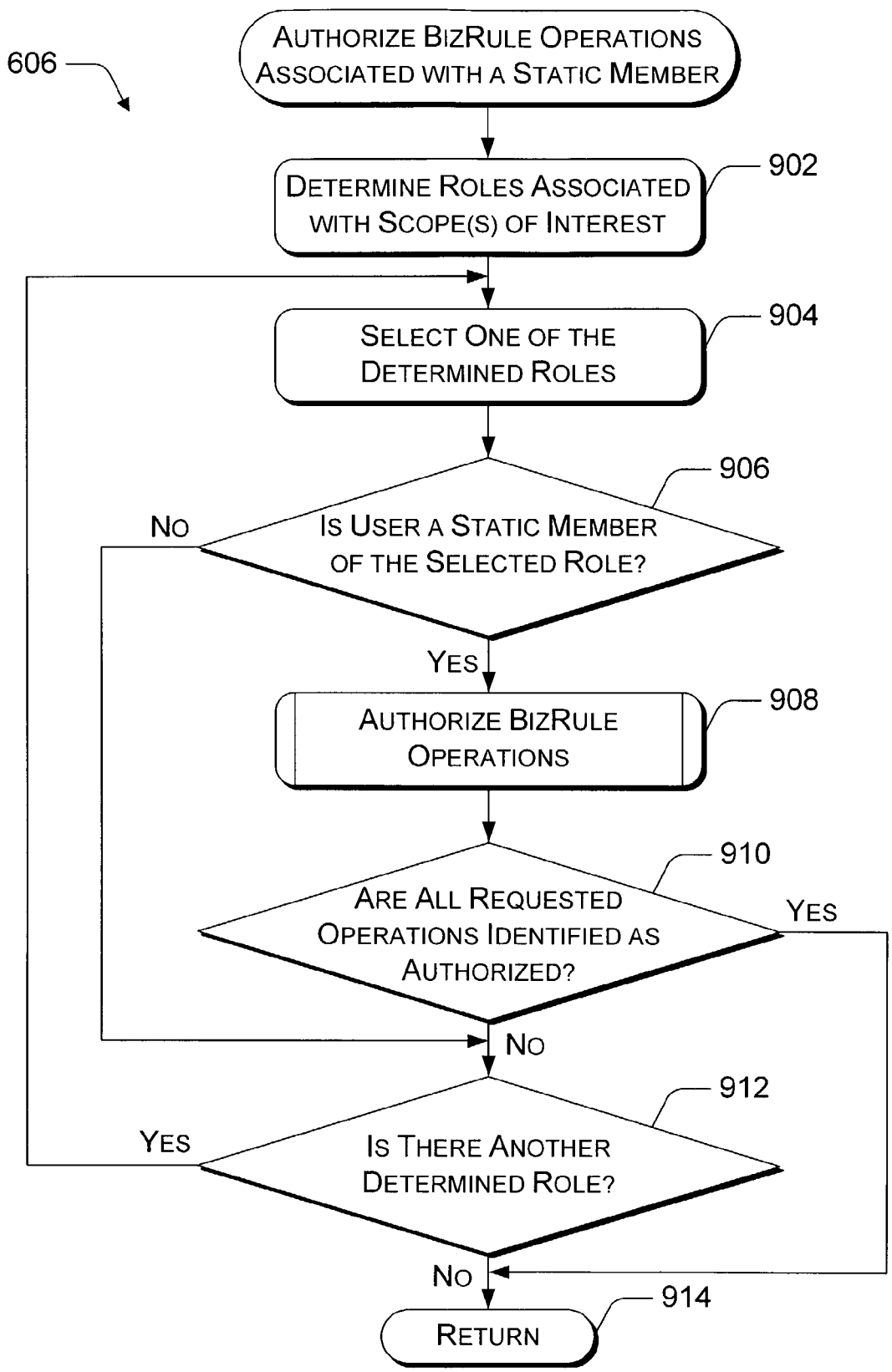
FIG. 9 illustrates an exemplary method for authorizing BizRule operations associated with a static member.

FIG. 9 illustrates an exemplary method 606 for authorizing BizRule operations associated with a static member.

At block 902, the method identifies role objects that are associated with one or more scope(s) of interest as indicated by the value of the scope array input parameter.

At block 904, the method selects one of the role objects identified at block 902.

At block 906, the method determines whether or not the user is a statically defined member associated with the selected role object by comparing the user-mode client context with the role object Members attribute. If it is determined that the user is not a statically defined member of the selected role object (the "No" branch from block 906), then the method continues at block 912. On the other hand, if it is determined that the user is a statically defined member of the selected role object (the "Yes" branch from block 906), then the method continues at block 908.

At block 908, the method authorizes requested operations that are represented by operation objects that are defined in terms of BizRules and are associated with the selected role object. A method for authorizing BizRule operations is described in further detail with respect to FIG. 10.

At block 910, the function determines whether or not all of the requested operations have been identified as being authorized. If it is determined that all of the requested operations are authorized (the "Yes" branch from block 910), then at block 914, the method returns. If it is determined that not all of the requested operations have been identified as being authorized (the "No" branch from block 910), then the method continues at block 912.

At block 912, the method determines whether or not there is another role object that was identified at block 902, but that has not been selected at block 904. If it is determined that there is at least one role object that was identified but that has not been selected (the "Yes" branch from block 912), then the method continues at block 904, selecting another one of the identified role objects. If it is determined that all of the role objects that were identified at block 902 have been selected through one or more iterations at block 904 (the "No" branch from block 912), then at block 914, the method returns.

Authorize BizRule Operations

Figure 10:
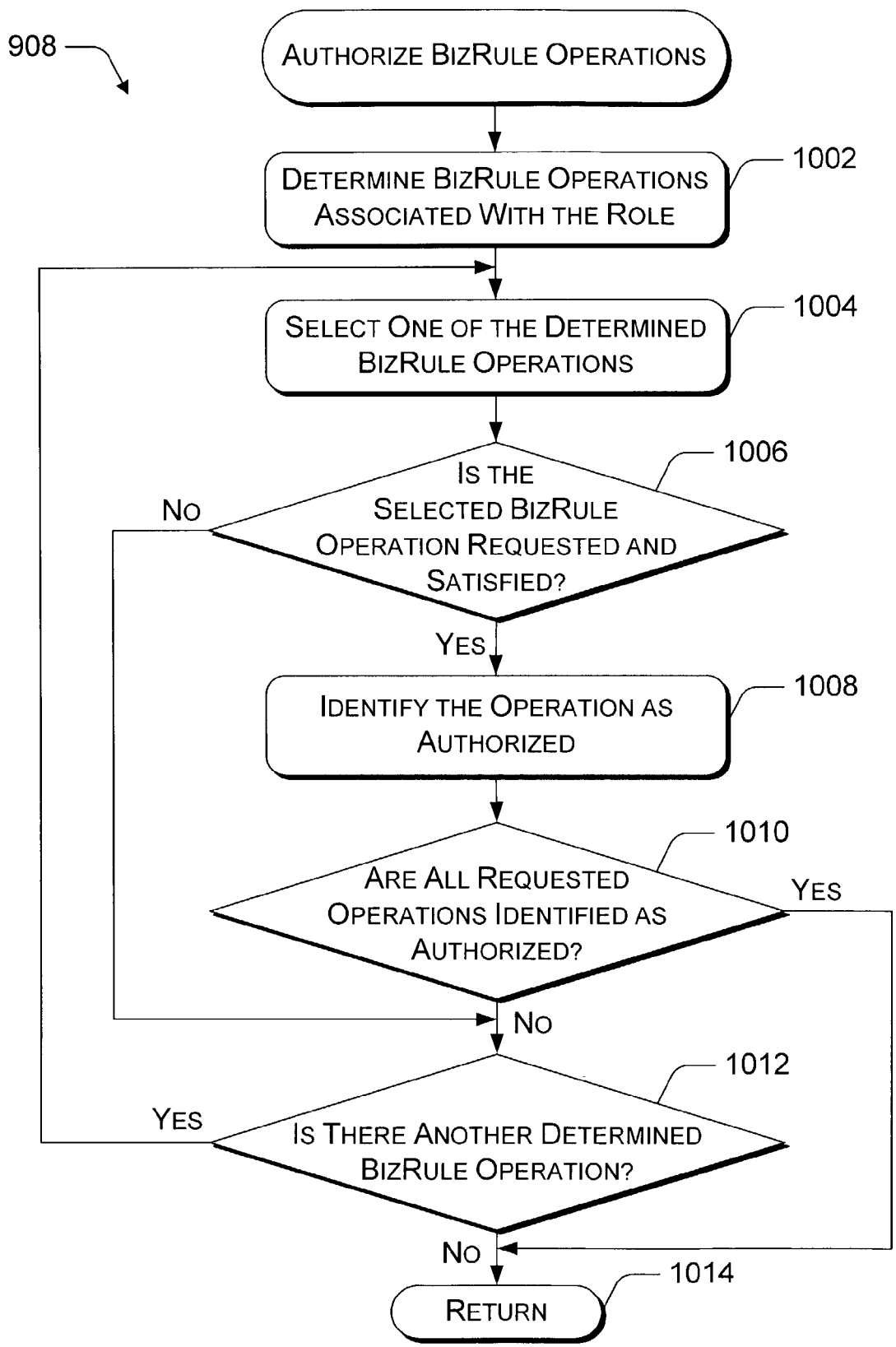
FIG. 10 illustrates an exemplary method for authorizing BizRule operations associated with an identified role object.

FIG. 10 illustrates an exemplary method 908 for authorizing BizRule operations associated with an identified role object.

At block 1002, the method identifies operation objects that are that are defined in terms of BizRules and are associated with the role object selected at block 904 as described above.

At block 1004, the method selects one of the BizRule operation objects identified at block 1002.

At block 1006, the method determines whether or not the selected BizRule operation object represents a requested operation, and whether or not the requirements of the BizRule are satisfied. If it is determined that the requirements are not satisfied and/or the selected operation object does not represent a requested operation (the "No" branch from block 1006), then the method continues at block 1012. On the other hand, if it is determined that the selected BizRule operation object does represent a requested operation and the BizRule requirements are satisfied (the "Yes" branch from block 1006), then the method continues at block 1008.

At block 1008, the method identifies as authorized the requested operation that is represented by the selected BizRule operation object.

At block 1010, the method determines whether or not all of the requested operations have been identified as being authorized. If it is determined that all of the requested operations are authorized (the "Yes" branch from block 1010), then at block 1014, the method returns. If it is determined that not all of the requested operations have been identified as being authorized (the "No" branch from block 1010), then the method continues at block 1012.

At block 1012, the method determines whether or not there is another BizRule operation object that was identified at block 1002, but that has not been selected at block 1004. If it is determined that there is at least one BizRule operation object that was identified but that has not been selected (the "Yes" branch from block 1012), then the method continues at block 1004, selecting another one of the BizRule operation objects identified in block 1002. On the other hand, if it is determined that all of the BizRule operation objects that were identified at block 1002 have been selected through one or more iterations at block 1004 (the "No" branch from block 1012), then at block 1014, the method returns.

Authorizing Operations for LDAP Query Members

Figure 11:
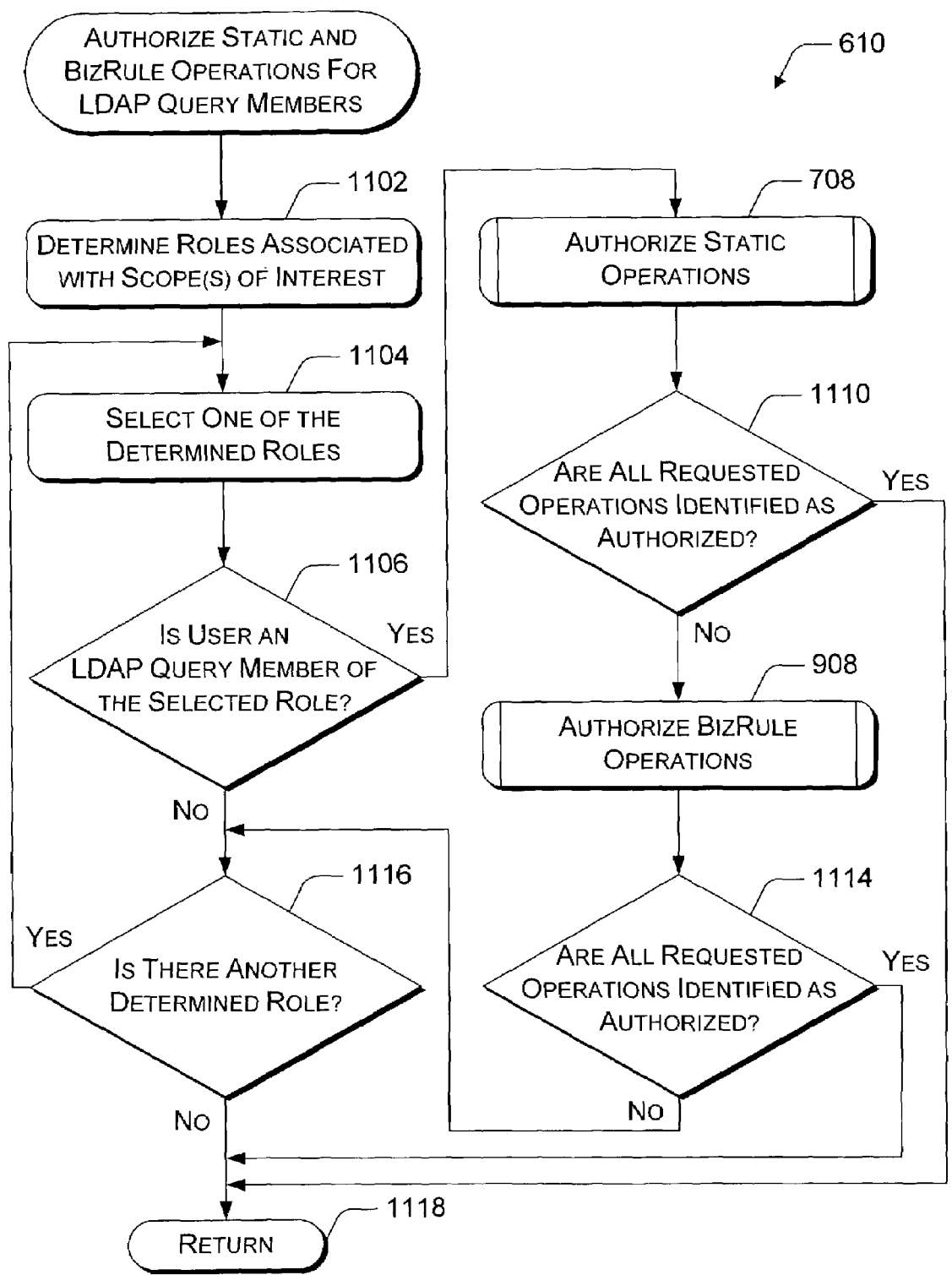
FIG. 11 illustrates a method for authorizing operations associated with LDAP query application group members.

FIG. 11 illustrates a method 610 for authorizing operations associated with LDAP query application group members.

At block 1102, the method identifies role objects that are associated with the designated scope(s) of interest.

At block 1104, the method selects one of the role objects identified at block 1102.

At block 1106, the method determines whether or not the user is a member of the role object selected at block 1104 based on an LDAP query associated with the selected role object. If it is determined that the user is not an LDAP query member of the selected role object (the "No" branch from block 1106), then the method continues at block 1116. On the other hand, if it is determined that the user is an LDAP query member of the selected role object (the "Yes" branch from block 1106), then the method continues at block 1108.

At block 708, the method authorizes requested operations that are represented by statically defined operation objects that are associated with the selected role object. A method for authorizing static operations is described in further detail above with respect to FIG. 8.

At block 1110, the method determines whether or not all of the requested operations have been identified as being authorized. If it is determined that all of the requested operations are authorized (the "Yes" branch from block 1110), then at block 1118, the method returns. If it is determined that not all of the requested operations have been identified as being authorized (the "No" branch from block 1110), then the method continues at block 1112.

At block 908, the method authorizes requested operations that are represented by BizRule operation objects that are associated with the selected role object. A method for authorizing BizRule operations is described in further detail above with respect to FIG. 10.

At block 1114, the method determines whether or not all of the requested operations have been identified as being authorized. If it is determined that all of the requested operations are authorized (the "Yes" branch from block 1114), then at block 1118, the method returns. If it is determined that not all of the requested operations have been identified as being authorized (the "No" branch from block 1114), then the method continues at block 1116.

At block 1116, the method determines whether or not there is another role object that was identified at block 1102, but that has not been selected at block 1104. If it is determined that there is at least one role object that was identified but that has not been selected (the "Yes" branch from block 1116), then the method continues at block 1104, selecting another one of the role objects identified in block 1102. On the other hand, if it is determined that all of the role objects that were identified at block 1102 have been selected through one or more iterations at block 1104 (the "No" branch from block 1116), then at block 1118, the method returns.

Authorization Manager

Authorization manager 108, illustrated in FIG. 2, provides a mechanism for an application administrator associated with application 210 to define and manage the role-based user permissions stored in authorization policy store 104.

Authorization manager 108 may be implemented to support delegation of administration at the authorization store, application, and/or scope levels. Support for delegation allows higher level administrators to give limited access to others to manage some subset of the data stored in authorization policy store 104. For example, a scope object may be defined that represents the accounting department in a company. The accounting department manager may be delegated as an administrator of the policy at the scope level that corresponds to the accounting department scope object. This would provide the accounting department manager with the ability to manage user permissions to application functions associated with the accounting department. In this implementation, each authorization store object, application object, and scope object can have an associated list of administrators and an associated list of readers. Administrators are able to perform all operations on objects in the authorization policy while readers only have read access to the objects in the authorization policy store.

Another benefit of the role-based authorization management system is the fact that because an authorization policy store can store authorization policies associated with multiple applications, an application administrator can manage the authorization policies for multiple applications through a single user interface, namely, the authorization manager.

Conclusion

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method implemented by an authorization management system to determine, based on data stored in a role-based authorization policy store, whether a user is authorized to perform a requested operation of an application, the method comprising:

receiving an authorization request comprising:
        an operation identifier that indicates the requested operation; and
        a scope identifier that indicates a scope of the application, wherein:
            the scope of the application represents a collection of operations associated with the application;
            the collection includes less than all of the operations associated with the application; and
            the requested operation is associated with the indicated scope of the application;
    identifying in the authorization policy store, an application object that represents the application, wherein the authorization policy store comprises an object-based hierarchical data structure, comprising:
        an application object that represents the application;
        an application group object that represents a group of users;
        a scope object that represents a collection of objects that together represent a portion, less than the whole, of the application;
        an operation object that represents a particular operation available in the application;
        a task object that represents a collection of operations available in the application; and
        a role object that represents a relationship between users and operations;
    wherein:
        an application group object is not a parent object to any other objects;
        a task object is not a parent object to any other objects; and
        a role object is not a parent object to any other objects;
    identifying, in the authorization policy store, a scope object that, according to the object-based hierarchical data structure, is a child object of the application object and that represents the scope of the application indicated by the scope identifier;
    identifying a role object that, according to the object-based hierarchical data structure, is a child object of the scope object, wherein the role object comprises a members attribute that identifies one or more entities that are members of the role;
    determining whether the user is represented by any one of the one or more entities that are members of the role;
    in an event that the user is represented by at least one of the one or more entities that are members of the role, determining that the user is authorized to perform the requested operation of the application; and
    in an event that the user is not represented by at least one of the one or more entities that are members of the role, determining that the user is not authorized to perform the requested operation of the application.

2. The method as recited in claim 1, further comprising returning a user authorization notification in response to the authorization request, wherein the user authorization notification comprises a list of authorized application operations.

3. The method as recited in claim 1, further comprising returning a user authorization notification in response to the authorization request, wherein the user authorization notification comprises one or more authorization pairs, each authorization pair comprising an indicator of an operation and an indicator of whether or not the user is authorized to have access to the operation.

4. A method as recited in claim 1 wherein the authorization request further comprises an operations array that includes one or more operation identifiers, each of the one or more operation identifiers indicating a particular application operation for which authorization is being requested, wherein the operation identifier that indicates the requested operation is one of the one or more operations identifiers included in the operations array.

5. A method as recited in claim 4, wherein the authorization request further comprises a scope array that includes one or more scope identifiers, each of the one or more scope identifiers indicating a particular application scope with which at least one of the particular application operations for which authorization is being requested is associated, wherein the scope identifier that indicates the scope of the application is one of the one or more scope identifiers included in the scope array.

6. A method as recited in claim 1, wherein:
    the members attribute of the role object identifies an application group object; and
    determining whether the user is represented by any one of the one or more entities that are members of the role comprises determining whether the user is represented by the application group object.

7. The method as recited in claim 6, wherein determining whether the user is represented by the application group object comprises evaluating a statically defined members attribute associated with the application group object, wherein the members attribute indicates one or more users that are members of the application group.

8. The method as recited in claim 6, wherein determining whether the user is represented by the application group object comprises evaluating a statically defined non-members attribute associated with the application group object, wherein the non-members attribute indicates one or more users that are to be excluded from the application group.

9. The method as recited in claim 6, wherein determining whether the user is represented by the application group object comprises evaluating a lightweight directory access protocol (LDAP) query of user attributes.

10. An authorization management system comprising:
    an authorization policy store comprising a hierarchical structure of authorization objects, wherein:
        the hierarchical structure of authorization objects represents role-based user permissions associated with one or more applications; and
        each of the authorization objects is selected from a group of authorization objects comprising:
            an authorization store object that is a root object of the hierarchical structure and represents the authorization policy store;
            an application object that is a child object of the authorization store object and represents a particular application;

an application group object that represents a group of users;

a scope object that represents a collection of authorization objects that together represent a portion, less than the whole, of a particular application;

an operation object that represents a particular operation available in a particular application;

a task object that represents a collection of operations available in a particular application; and a role object that represents a relationship between users and operations, wherein the role object comprises:
- a members attribute that identifies one or more users;
- an operations attribute that references one or more operation objects; and
- a task attribute that references one or more task objects;
- wherein the role object indicates that users identified in the members attribute are:
  - authorized to access operations represented by operation objects identified in the operations attribute and
  - authorized to access operations represented by task objects identified in the tasks attribute;

wherein:
- an application group object is a child object of an authorization store object, an application object, or a scope object;
- an application group object is not a parent object to any other objects;
- a scope object is a child object of an application object or another scope object;
- an operation object is a child object of an application object;
- a task object is a child of an application object or a scope object;
- a task object is not a parent object to any other objects;
- a role object is a child object of an application object, or a scope object;
- a role object is not a parent object to any other objects; and an authorization interface that provides a mechanism for a particular one of the one or more applications to access the authorization management system to verify the role-based user permissions.

11. The authorization management system as recited in claim 10, further comprising:
an authorization manager that provides a mechanism for creating, modifying, or deleting the role-based user permissions.

12. The system as recited in claim 10 wherein the authorization interface comprises:
an authorization store class that is defined in terms of methods that enable initialization of an authorization store represented by a particular authorization store object; and
at least one application class that is defined in terms of methods that enable access to authorization objects that are associated with the particular application via a particular application object.

13. The system as recited in claim 12 wherein the authorization interface further comprises:
at least one class selected from a group of classes comprising:
an operation class that is defined in terms of methods that enable access to operation objects;
a task class that is defined in terms of methods that enable access to task objects;
a scope class that is defined in terms of methods that enable access to scope objects;
an application group class that is defined in terms of methods that enable access to application group objects;
a role class that is defined in terms of methods that enable access to role objects; and
a client context class that is defined in terms of methods that enable maintenance of a representation of a particular user.

14. The authorization management system as recited in claim 10, wherein the task object comprises one or more attributes selected from a group of attributes comprising:
an operations attribute that specifies a list of one or more operations that a user is granted access to perform when the user is granted access to perform the task;
a tasks attribute that specifies a list of one or more other tasks that a user is granted access to perform when the user is granted access to perform the task; and
a business rule attribute that stores text of a script to implement a business rule, thereby enabling a dynamic condition to be associated with the task.

15. The authorization management system as recited in claim 10, wherein the application group object comprises one or more attributes selected from a group of attributes comprising:
a members attribute that specifies a static list of users and/or groups that are members of the application group represented by the application group object;
a non-members attribute that specifies a static list of users and/or groups that are not members of the application group represented by the application group object; and
an LDAP query attribute that stores a Lightweight Directory Access Protocol (LDAP) query used to determine whether or not a particular user is a member of the application group represented by the application group object.

16. A system comprising:
means for storing hierarchically related data objects that represent a role based user authorization policy, the hierarchically related data objects comprising:
an application object that represents an application;
an application group object that represents a group of users;
a scope object that represents a collection of objects that together represent a portion, less than the whole, of the application;
an operation object that represents a particular operation available in the application;
a task object that represents a collection of operations available in the application; and
a role object that represents a relationship between users and operations;
wherein:
an application group object is not a parent object to any other objects;
a task object is not a parent object to any other objects; and
a role object is not a parent object to any other objects;
means for receiving from an application, an indication of a client request to perform an application operation; and
means for verifying that the client is authorized to perform the application operation based on the authorization policy by:

determining an application scope associated with the client request, wherein the application scope comprises a portion, less than the whole, of the application;

subsequent to determining the application scope, determining a role associated with the application scope that was determined; and subsequent to determining the role associated with the application scope that was determined, determining whether the client is identified as a member of the role.

17. The system as recited in claim 16, further comprising:

means for modifying the related data objects to represent changes in the authorization policy.

18. One or more computer storage media encoded with instructions that, when executed, direct a computing system to perform a method, the method comprising:

receiving an indication of a user request to perform an operation associated with an application, wherein the user request is from a user of the application; and accessing a role-based authorization policy to:

determine an application scope associated with the user request, wherein the application scope comprises a portion, less than the whole, of the application;

subsequent to determining the application scope, determine a role associated with the application scope that was determined; and subsequent to determining the role associated with the application scope that was determined, determine whether the user is identified as a member of the role;

wherein the role-based authorization policy comprises a hierarchical data structure comprising:

an application object that represents the application;

an application group object that represents a group of users;

a scope object that represents a collection of objects that together represent a portion, less than the whole, of the application;

a task object that represents a collection of operations available in the application; and a role object that represents a relationship between users and operations;

wherein:

an application group object is not a parent object to any other objects;

a task object is not a parent object to any other objects; and a role object is not a parent object to any other objects.

* * * * *